INVENTOR
GORDON B. BARRUS
BY Samuel Lindenberg
Arthur Freilich
ATTORNEYS 3,423,658
DRIVE SYSTEM FOR A STEP MOTOR
Gordon B. Barrus, El Segundo, Calif., assignor to Data Products Corporation, Culver City, Calif., a corporation of Delaware
Filed Aug. 24, 1965, Ser. No. 482,126
U.S. Cl. 318—138          15 Claims
Int. Cl. H02k 29/00; H02p 1/00; 3/00; 7/00

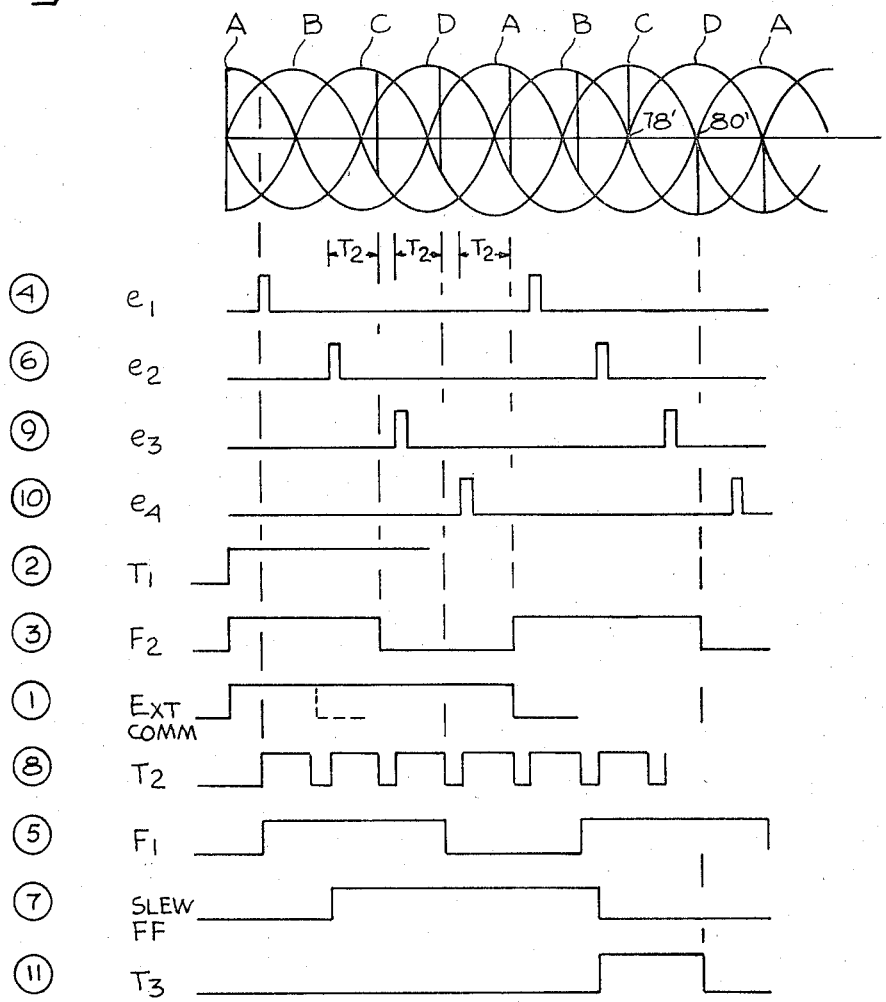
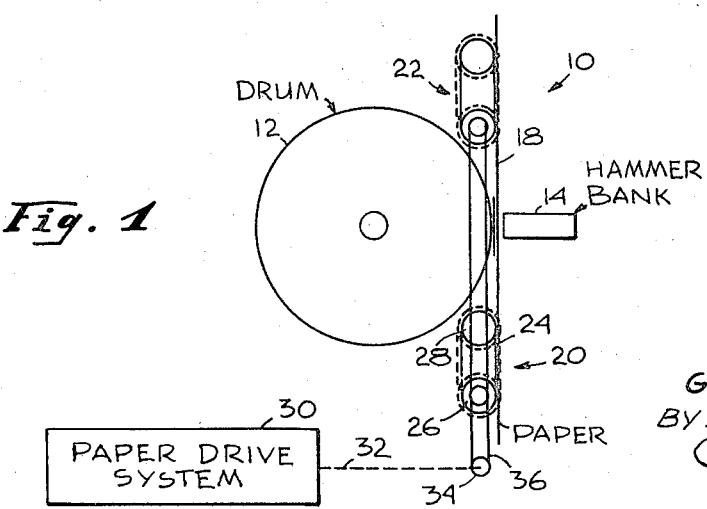

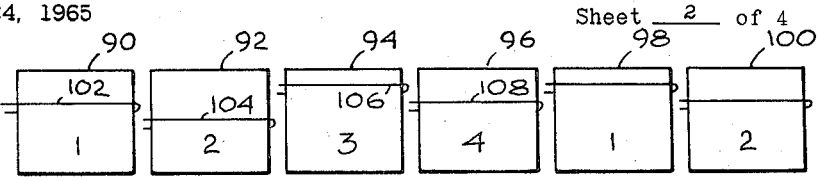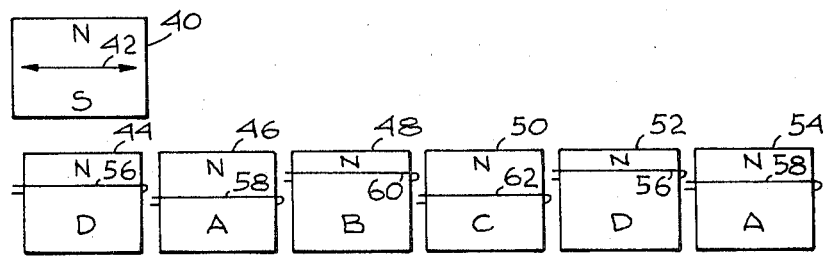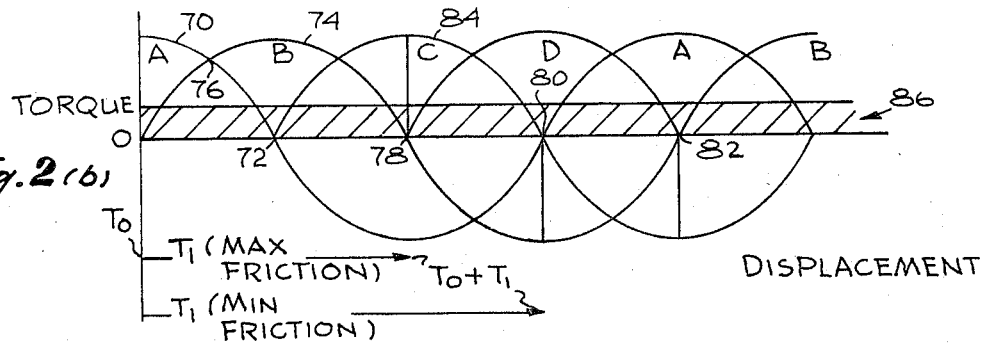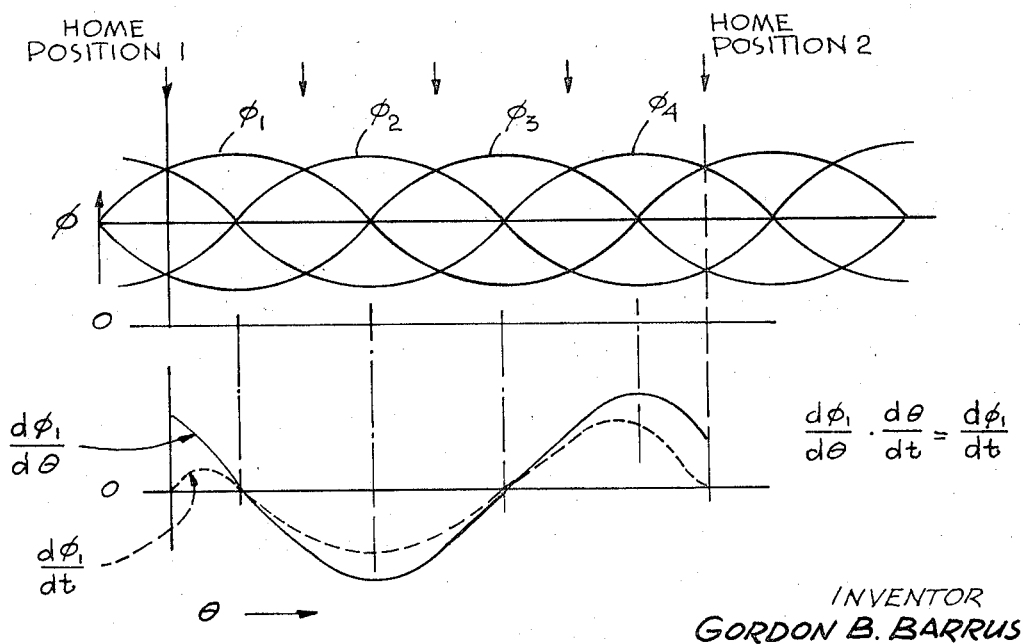

ABSTRACT OF THE DISCLOSURE

A system useful in a high speed printing apparatus for moving paper. The system utilizes a stepping motor to which pulses are applied to incrementally drive the motor armature. The coupling between the motor and paper is chosen such that the paper is stepped one line for a several step motor sequence. The initial steps in the motor sequence are used to impart high torque to the motor armature and subsequent steps are used to dissipate the armature kinetic energy by the time it reaches its rest position to thus enable the armature and the load coupled thereto to be stopped without oscillation.

---

This invention relates generally to means for driving paper and the like past a printing or other operational station and finds particular utility in line printers for incrementally driving the paper past a printing hammer bank.

Line printers which are often used with digital data processing equipment as output devices, include a printing station usually consisting of a plurality of aligned hammers or electrodes. A paper strip is usually incrementally driven past the printing station so that a full line of printing is performed each time the strip comes to rest. Although present state of the art printers are capable of very fast operation, often on the order of 1,000 lines per minute, attempts to even further increase the speed are oftentimes restricted by the rate at which the paper can be driven. That is, it is necessary after each line of printing to move the paper and permit it to settle in its new position before a subsequent line can be printed if aligned symbols and generally neat printing are to be achieved. In order to move the paper very rapidly from a rest position, it is necessary to very quickly introduce a great amount of energy into the paper drive system. In order to stop and hold the paper in its next assigned rest position, a force must be applied to the paper drive system tending to secure it in its next rest position. However, unless the energy introduced into the system is dissipated by the time the paper reaches the next assigned rest position, it will tend to oscillate about this position. If printing is attempted while the paper is in motion, the printed symbols of course will not be aligned and a generally poor looking product will result. If, on the other hand, printing is inhibited until the oscillations decay, the overall rate at which the system can print is reduced.

In view of the foregoing, it is an object of the present invention to provide an improved system for rapidly incrementally moving paper and the like.

In accordance with the invention, a paper drive system is provided including a motor mechanically coupled to the paper. The motor is of the stepping variety which permits an armature to be incrementally driven in response to each pulse applied to the motor field windings. The coupling between the motor and the paper is chosen such that the paper is stepped one line for a several step sequence of the motor. The initial steps in the motor sequence are used to impart a great deal of initial energy and torque to the armature and subsequent steps are used to extract or dissipate the kinetic energy from the armature by the time it reaches its rest position to thus enable the armature and the load coupled thereto to be stopped without oscillation. In addition to the system being useful for stepping the paper one line at a time in a step mode, it can be employed in a slew mode in which the paper will move continually but from which it can be transferred to the step mode for stopping without oscillation.

In a preferred embodiment of the invention, a four step motor sequence is used meaning that four different field windings are successively energized for each line of paper movement. The torques produced by the respective field windings overlap one another. That is, as the armature moves in response to one energized winding, the torque produced by it diminishes while the torque produced by the next winding, if energized, is increasing toward maximum. Therefore, in order to provide maximum average torque, the windings are sequentially energized at their respective optimum torque points. If a winding is allowed to remain energized until the torque produced by it approaches zero, it will carry the armature past the rest position for that winding and into a negative torque region in which the torque produced opposes armature movement. In accordance with the invention, this negative torque region is utilized to brake the armature and its associated load. That is, in order to stop the armature at a final rest position, i.e., the rest position of the fourth winding, negative torque is applied by the third winding prior to the armature reaching the final rest position in order that the kinetic energy of the armature be completely dissipated by the time it actually reaches the final rest position. Inasmuch as system friction varies depending upon several factors, the kinetic energy of the armature at any particular position cannot be known with any degree of certainty and thus there is no single armature position at which it would always be appropriate to energize the third winding. In accordance with the invention, the kinetic energy is dissipated by energizing the third winding to apply its torque to the armature at a particular time interval after the first winding is energized rather than at any particular position of the armature. If the armature had encountered minimum system friction, it will possess maximum kinetic energy and its displacement will be such that when the third winding is energized, negative torque will immediately be applied to the armature to thus begin to slow the armature. On the other hand, if the armature had encountered maximum system friction, it will possess minimum kinetic energy and its displacement will be such that when the third winding is energized, positive torque will be initially applied to the armature to impart further energy thereto, prior to negative torque being applied to dissipate the armature's kinetic energy by the time it reaches its final rest position.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a perspective drawing generally illustrating the structure of a line printer paper drive system which can advantageously employ the features of the present invention;

FIGURE 2(a) is a schematic representation of a stepping motor utilized in the present invention;

FIGURE 2(b) illustrates torque curves generated by the field windings of FIGURE 2(a) on the armature thereof and showing exemplary system friction encountered by the armature;

FIGURE 2(c) illustrates flux and voltage waveforms useful in sensing the position and speed of the armature of FIGURE 2(a);

Figures 3A, 3B:
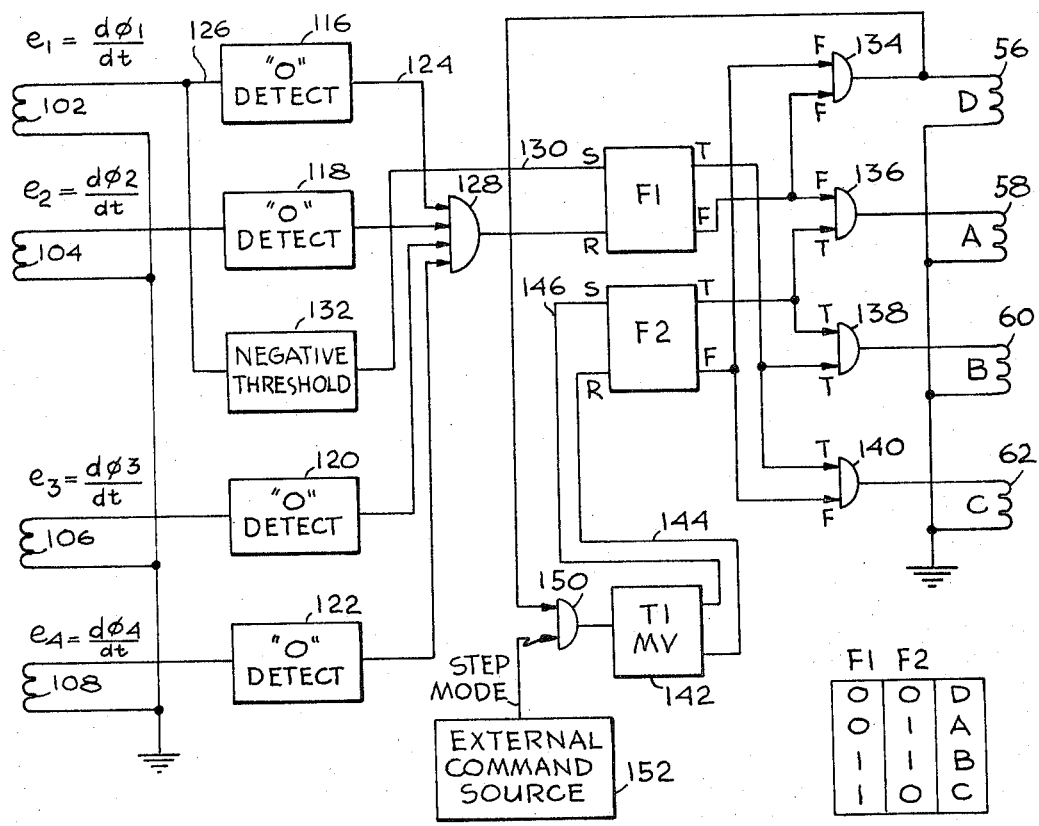

FIGURE (3a) is a schematic block diagram illustrating an exemplary circuit means for controlling the field windings of FIGURE 2(a);

FIG. 3(b) is a truth table for the logic circuitry of FIG. 3(a).

Figure 5:
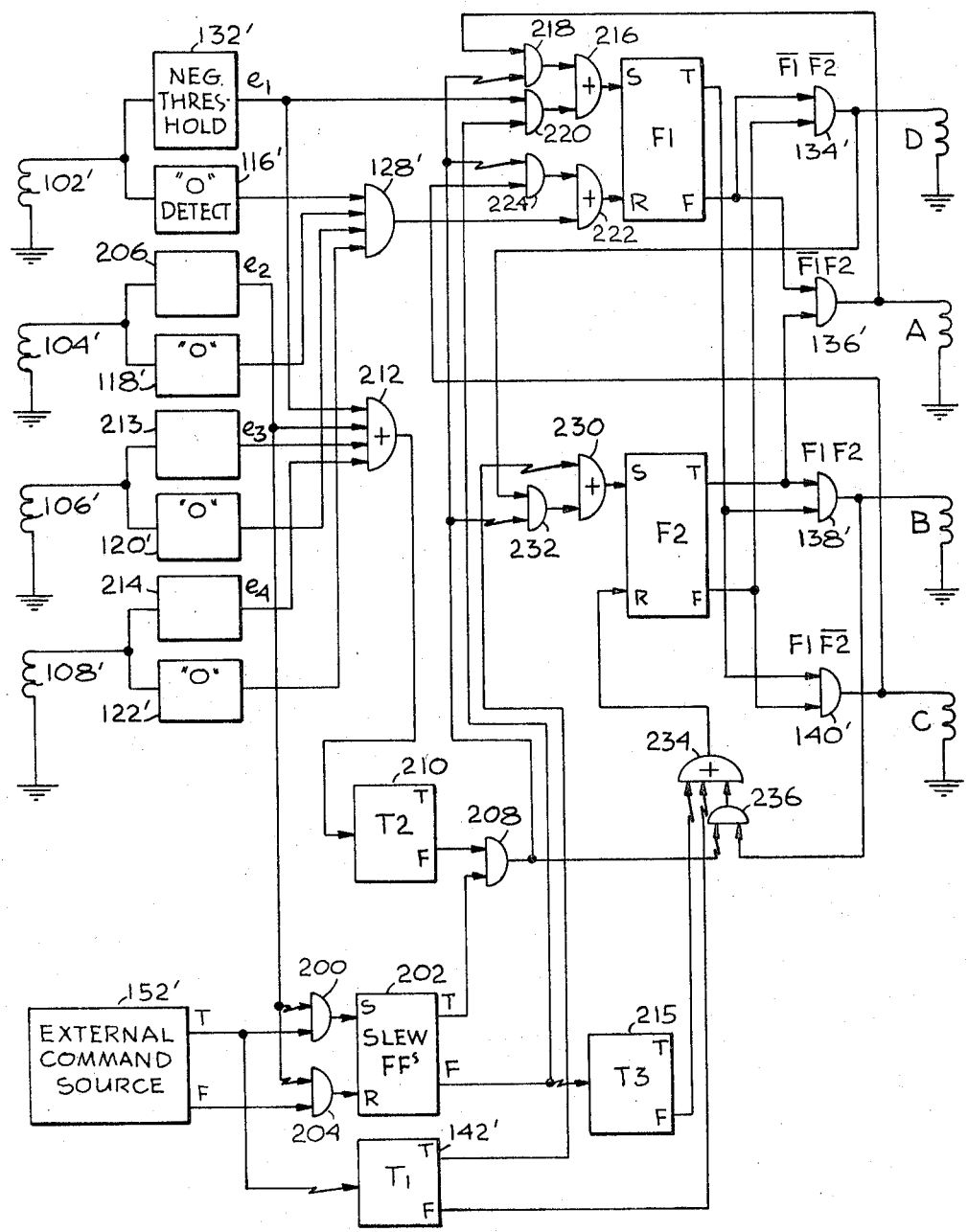

FIGURE 4 illustrates torque curves showing how the invention can function in a slew mode; and FIGURE 5 is a schematic block diagram showing how the field windings of FIGURE 2(a) can be controlled to permit operation in either a slew or step mode.

Attention is now called to FIGURE 1 of the drawings which schematically illustrates a line printer apparatus 10 which is frequently used as a data processing output device. The printer apparatus 10 usually consists of a printing drum 12 which has raised alphanumeric characters formed on circumferential tracks of the drum. Most conventional drums have up to 132 tracks. Positioned opposite to each of these tracks is a different hammer in a hammer bank 14. Between the hammer bank 14 and the drum 12 are a ribbon 16 and paper 18 upon which information is to be printed. The paper 18 is adapted to be moved incrementally by sprocket chains 20 and 22 which have fingers 24 thereon adapted to be engaged in holes (not shown) running vertically along the edges of the paper 18. The sprocket chains 20 and 22 are supported on upper and lower rollers 26 and 28. Roller 26 can be driven by a belt 29, for example, coupled to a paper drive system 30.

In the operation of the printer apparatus 10, the paper 18 is normally stepped one line at a time past the hammer bank 14. At each position of the paper 18, a full line is printed by appropriately energizing the individual hammers in the bank 14 to strike the paper 18 against the ribbon 16 and the characters on the drum 12. Each hammer is propelled against the paper when the appropriate character on the drum moves into printing position. Thus, it should be appreciated that any single line can be printed in a maximum of one drum revolution. After the line is printed, the paper drive system 30 drives the pulley 34 to in turn move the belt 29 and sprocket chain 20 to thus step the paper 18 by one line.

In order for the printing apparatus 10 to operate very rapidly, i.e., on the order of 1,000 or more lines per minute, it is essential that the paper drive system 30 be able to move the paper 18 very rapidly from one line to the next. More particularly, at the initiation of each paper step, it is essential that a significant force or torque be provided by the paper drive system 30 in order to drive the roller 26. However, it is not only essential to initiate the movement of the paper rapidly, it is also essential to be able to brake the paper movement rapidly in order to avoid any oscillation about the new paper position. Thus, in order for the paper to be rapidly driven, it is necessary to initially introduce a great deal of energy into the paper moving mechanism to rapidly move the paper from an initial rest position to a final rest position and to subsequently dissipate this energy by the time the paper reaches its final rest position in order to prevent oscillation about that position. If the paper were to continue to oscillate and printing were to be performed, the printed characters would of course be misaligned and a generally poor printed product will result. If the oscillations continued for several milliseconds, and printing was not performed until they decayed, the overall speed of the entire printing apparatus would of course be reduced.

The present invention is directed to a paper drive system 30 for initially introducing a great deal of energy into the paper moving mechanism to rapidly move it from an initial rest position and in addition to dissipate that energy by the time the paper moves to a final rest position.

In accordance with the invention, the paper drive system 30 includes a stepping motor having a movable armature and selectively energizable means for exerting a force or torque on the armature to incrementally move it along a path. The armature movement can be coupled through shaft 32 to pulley 34 and thence through the belt 29 to the roller 26. The stepping motor can be any one of several available on the market, a typical one being manufatcured by the Superior Electric Company, Bristol, Conn., type SS250-1066. A schematic representation of a stepping motor which has most of the characteristics of stepping motors readily available on the market but whose operation can be more clearly explained herein, is shown in FIGURE 2(a).

The stepping motor of FIGURE 2(a) includes a movable armature 40 which can comprise a permanent magnet, poled as illustrated, and restrained to move in a path indicated by the arrows 42. A plurality of spaced pole pieces 44, 46, 48, 50, 52 and 54 are provided for developing magnetic fields adapted to interact with that produced by the armature 40 to thus provide a force on the armature tending to move it. The motor can utilize any number of pole pieces but in accordance with the preferred embodiment of the invention, each set of pole pieces is comprised of four pole pieces and any number of such sets can be provided. Each of the pole pieces has a field winding wound thereon and the field winding on every fourth pole piece is connected in series. Thus, a field winding 56, designated as the D field winding, is wound on pole piece 44 and pole piece 52. Similarly, field winding 58, designated as the A field winding, is wound on pole piece 46 and pole piece 54 and every fourth pole piece thereafter. Winding 60 is similarly wound on pole piece 48 and is designated as the B field winding and winding 62 is designated as the C field winding and is wound on pole piece 50.

Consider initially that the armature 40 is positioned over pole piece 44 as illustrated in FIGURE 2(a). Energization of the A field winding on pole piece 46 will apply a force or torque to the armature 40 which is substantially represented by the curve 70 in FIGURE 2(b). This force tends to move the armature 40 to the right or in an arbitrarily defined positive direction. The force will of course impart kinetic energy to the armature 40 and when it moves to a position over the pole piece 46, will have a velocity which will carry it past the pole piece 46. The pole piece 46 would then exercise a negative force on the armature 40 tending to pull it back to the pole piece 46. Thus, it can be seen that the curve 70 intersects the zero axis at point 72 coincident with the center of the pole piece 46 defining the rest position unique to that pole piece.

In order to provide maximum initial torque or force on the armature 40, the A field winding on the pole piece 46 can be deenergized when the force exertable by the B field winding on pole piece 48 exceeds that exertable by the A field winding on pole piece 46. Curve 74 describes the torque or force exertable on the armature 40 by an energized B field winding on pole piece 48. Accordingly, in order to initially introduce maximum energy into the armature 40, the A field winding is deenergized when the armature 40 has a displacement indicated by point 76 and the B field winding on pole piece 48 is then energized to carry the armature 40 past the unique rest position associated with pole piece 48, i.e., point 78.

The paper drive system and paper driving mechanism are subjected to differing friction conditions depending upon several factors. When a minimum friction condition exists, at time $T_1$, the armature 40 will have a much greater displacement than it will under a maximum friction condition. For example, at time $T_1$, under maximum friction conditions, the displacement of the armature 40 is indicated by point 78 and under minimum friction conditions, the displacement of the armature 40 is indicated by point 80. Regardless of what friction conditions prevail, it is desirable of course that the movement of the armature 40 be stopped without oscillation at a point which is defined as being coincident with the rest position 82 uniquely associated with the pole piece 52. In order to stop the movement of the armature 40 without oscillation, it is necessary to substantially completely dissipate the kinetic energy of the armature prior to it reaching point 82. Dissipation of this energy is effected when the armature is between points 78 and 82.

More particularly, at time $T_1$ the B field winding on pole piece 48 is deenergized and the C field winding on pole piece 50 is energized. If a maximum friction condition prevails, the armature 40 will have a displacement represented by the point 78 at time $T_1$ and thus energization of the C field winding on pole pice 50 will provide a positive force represented by the second half of the positive half cycle of waveform 84. Field winding C will remain energized as the armature 40 moves past point 80 and will thereafter exert a negative force on the armature 40 of course reducing its kinetic energy. The kinetic energy of the armature 40 should be substantially dissipated by the time it arrives at point 82 and by then energizing the D field winding on pole piece 52, the armature 40 can be locked into position without oscillation.

On the other hand, assuming minimum friction conditions, when the armature 40 moves past point 78, it has a great deal of kinetic energy and thus does not require an additional positive force from field winding C. Instead, field winding B remains energized until the armature moves to point 80 and then field winding B is deenergized and field winding C energized to permit field winding C to slow up the armature still further to thereby substantially reduce its speed to zero by the time it reaches point 82.

Maximum and minimum friction conditions have thus far been considered. Intermediate friction conditions will of course also exist meaning that the displacement of the armature 40 at time $T_1$ can be anywhere between points 78 and 80. Regardless of where it is, in accordance with the invention, the system will jump from the torque or force curve 74 of field winding B to the curve 84 of field winding C.

In order for the speed of the armature 40 to be reduced to zero by the time it reaches point 82, it is necessary that the area above the zero axis of FIGURE 2(b) enclosed by the force curves minus the friction be equal to the area below the axis enclosed by the force curves plus the friction represented by the cross-hatched area 86. When these conditions prevail, the armature 40 will of course retain no kinetic energy when it reaches point 82 and thus energization of the D field winding on pole piece 52 will stop and lock the armature 40 but will not cause it to oscillate.

In order to effectively provide maximum initial average force on the armature 40 and in order to brake its movement without oscillation, means are provided for sensing the position and speed of the armature. These means include auxiliary pole pieces 90, 92, 94, 96, and 98 which are positioned substantially 90° out of phase with respect to the aforementioned pole pieces. Each of the auxiliary pole pieces has a sense winding thereon, every fourth sense winding also being connected in common. Thus, sense winding 102 is coupled to auxiliary pole pieces 90 and 98, sense winding 104 is coupled to auxiliary pole pieces 92 and 100, and sense windings 106 and 108 are respectively coupled to auxiliary pole pieces 94 and 96 and respectively to every fourth auxiliary pole piece thereafter. Movement of the armature 40 past the auxiliary pole pieces generates flux conditions in the pole piece as substantially represented by the flux curves of FIGURE 2(e). Thus, when the armature 40 is directly over auxiliary pole piece 90, the flux $\phi_1$ in auxiliary pole piece 90 is at a maximum and then falls off as the flux in auxiliary pole piece 92 represented by the curve $\phi_2$ increases. A waveform representing $d\phi_1/d\theta$ where $\theta$ represents displacement is also shown in FIGURE 2(c). Similar curves representing changes in flux $\phi_2$, $\phi_3$, and $\phi_4$ as a function of displacement can also be provided but have not been shown in FIGURE 2(c) for the sake of simplicity. A curve representing $d\phi_1/dt$ is also shown in FIGURE 2(c) and this curve is the product of $d\phi_1/d\theta$ and velocity $(d\theta/dt)$ (not shown). The voltage induced in each of the sense windings on the auxiliary pole pieces is of course equal to $d\phi/dt$. Thus, utilizing the signals provided on the sense windings on the auxiliary pole pieces, a first indication can be provided for the purpose of indicating when the force exertable by field winding B exceeds that exertable by field winding A. This time is indicated when the potential (i.e., $d\phi_1/dt$) across the sense winding 102 reaches a certain threshold value. A second useful indication is provided by the sense windings which serves to indicate when the kinetic energy of the armature 40 is dissipated. That is, when the speed of the armature 40 is equal to zero, $d\phi/dt$ for all of the sense windings will also be equal to zero. By sensing when the speed is zero, the D field winding on pole piece 52 can be energized to lock the armature 40 into place without oscillation.

Attention is now called to FIGURE 3 which illustrates a schematic block diagram of logical circuitry employed to control the energization and deenergization of the field windings on the pole pieces in response to voltages induced in the sense windings on the auxiliary pole pieces. Each of the sense windings 102, 104, 106, and 108 is connected to the input of a different zero detect circuit 116, 118, 120, and 122 respectively. The zero detect circuits can be threshold devices which provide a logically true output signal on terminals 124 when the input signals applied thereto on terminals 126 are below a certain absolute threshold magnitude. All of the output terminals 124 are connected together to the input of an And gate 128 whose output is connected to the reset input terminal of a flip-flop F1. The set input terminal of the flip-flop F1 is derived from the output terminal 130 of a negative threshold circuit 132 whose input is connected to the sense winding 102. When the sense winding 102 provides a signal having a magnitude below a certain threshold, circuit 132 provides a true output signal on terminal 130 to the set input terminal of flip-flop F1.

The outputs of two terminal And gates 134, 136, 138, and 140 are respectively connected to the D, A, B, and C field windings 56, 58, 60, and 62. The inputs to And gate 134 are derived from the false output terminals of both flip-flops F1 and F2, the inputs to And gate 136 from the false and true output terminals respectively of flip-flops F1 and F2, the inputs to And gate 138 from the true output terminals of flip-flops F1 and F2, and the inputs to And gate 140 from the true and false output terminals respectively of flip-flops F1 and F2.

The inputs to flip-flop F2 are derived from a multivibrator 142 which has an unstable period equal to $T_1$. During its unstable period, multivibrator 142 will provide a true signal on output line 146 to thus set flip-flop F2. On the other hand, when multivibrator 142 is in its stable state, it will provide a true signal on output terminal 144 to thus reset flip-flop F2. Multivibrator 142 is switched to its unstable state by a pulse from the output of And gate 150. Two inputs to the And gate 150 are respectively derived from the output of And gate 134 and from an external command source 152. That is, when the external command source 152 provides an initiating signal to the And gate 150, if the system is in a rest position with the armature 40 held in position over a D winding pole piece, the multivibrator 142 will be switched to its unstable state switching flip-flop F2 to a true state and thereby energizing the A field winding. The armature 40 therefore begins to move in response to the energization of the A field winding and when the force exertable by the B field winding exceeds that exertable by the A field winding, the threshold circuit 132 will provide a true output signal to set flip-flop F1 and energize the B field winding. At the end of time $T_1$, the multivibrator 142 will switch back to its stable state thereby resetting flip-flop F2 to thus energize the C field winding. When the kinetic energy of the armature is substantially completely dissipated, the And gate 128 will provide a true output signal to thus reset flip-flop F1 to therefore lock the armature 40 into position above the D winding pole piece 52.

Thus far paper movement in a step mode only has been considered. Although this is the normal mode in which the paper is driven while printing is being performed, it is also desirable to sometimes move the paper through several lines in a substantially continuous fashion rather than in a stepped or incremental fashion. It is additionally desirable to move the armature at a reasonably constant slew velocity under varying friction loads in order to assure proper paper stacking. In addition, of course, it is necessary to be able to brake the armature movement without oscillation. Thus, in accordance with a further aspect of the invention, as shown in FIGURES 4 and 5, a paper drive system is provided which can operate in either a slew or step mode.

Attention is initially called to FIGURE 4 wherein operation in both a slew and brake mode is illustrated. In the slew mode, the field windings are successively energized in a manner which maintains a substantially steady reasonably high slew mode velocity compensating for frictional effects. That is, the field windings are successively energized at points in time spaced by no less than a fixed time interval $T_2$. More particularly, each field winding is energized a time interval $T_2$ after the armature moves past a certain position as indicated by the pulses provided by sense windings 102, 104, 106, and 108. If minimum friction conditions exist, $T_2$ is sufficiently long to permit negative torque to affect the armature to thus slow it up. If maximum friction conditions exist, then only positive torque will be applied to the armature to thereby attempt to maintain its speed. It should be appreciated that deenergization of one field winding and energization of a subsequent one can occur at points on the torque curves of FIGURE 4, other than those illustrated. For example, if maximum friction conditions prevail, field winding C will be energized earlier in terms of displacement since the interval $T_2$ will expire before the armature moves to the position shown. In order to assure that a subsequent field winding is not energized until it can at least provide more torque than an already energized winding, the torque curve crossover points are sensed using a negative threshold detection technique similar to that utilized in FIGURE 3(a) for switching from torque curve A to torque curve B. In order to brake the paper movement after the slew mode, operation is transferred to a brake mode which is similar to the latter portion of the step mode previously described.

Mechanization for coupling the sense windings to the field windings for performing both slew, brake, and step mode operations is shown in FIGURE 5 and is basically similar to the apparatus illustrated in FIGURE 3(a). Elements in FIGURE 5 which directly correspond to elements in FIGURE 3(a) will be identified by the same designating numerals which however will be primed. Thus in the embodiment of FIGURE 5, the external command source 152' is provided which defines a true state to identify a slew mode and a false state to identify the step mode already discussed. The true output terminal of the command source 152' is connected to the input of an And gate 200 whose output is connected to the set input terminal of a slew flip-flop 202. The false output terminal of the command source 152' is connected to the input terminal of an And gate 204 whose output is connected to the reset input terminal of the slew flip-flop 202. The And gates 200 and 204 are enabled in response to the leading edge of a pulse E2 provided by a negative threshold circuit 206 connected to sense winding 104'. In order to represent that gates 200 and 204 are responsive to the leading edge of the pulse provided by threshold circuit 206, the inputs to the gates 200 and 204 from the threshold circuit 206 are illustrated with a curve therein indicating that it is the change in DC level or AC characteristic of the pulse to which the gate is responsive.

The true output terminal of the command source 152' is also connected to the input of multivibrator 142', which defines an interval $T_1$ as has previously been described. As shown, the multivibrator 142' is responsive to a pulse edge. The true output terminal of the slew flip-flop 202 is connected to the input of And gate 208. Also connected to the input of And gate 208 is the false output terminal of a multivibrator 210 which defines a time interval $T_2$. The multivibrator 210 is set by the leading edge of a pulse provided by Or gate 212. The inputs to Or gate 212 are respectively derived from the outputs of threshold circuit 132', and threshold circuits 206, 213, and 214. Each of these threshold circuits is respectively responsive to a negative threshold level out of the sense windings 102', 104', 106', 108' for providing positive-going pulses $e_1$, $e_2$, $e_3$, $e_4$. Thus, And gate 208 provides a true output pulse when slew flip-flop 202 is true and multivibrator 210 is false. Multivibrator 210 will be false except for an interval $T_2$ after any one of the negative threshold circuits provides a pulse to Or gate 212.

The false output terminal of slew flip-flop 202 is connected to the input of multivibrator 215 which defines a time interval $T_3$ after the slew flip-flop 202 switches to a false state. The output of multivibrators 142' and 215 and multivibrator 210 through Or gate 208, control the flip-flops F1 and F2 which in turn control the field windings as aforedescribed.

More particularly, an Or gate 216 is connected to the set input terminal of flip-flop F1. The output of And gates 218 and 220 are connected to the input of Or gate 216. The inputs to And gate 220 are derived from the false output terminal of slew flip-flop 202 and from the output terminal of threshold circuit 132'. Thus, And gate 220 functions to set flip-flop F1 to a true state in response to a pulse from the threshold circuit 132' during the step mode, defined by the false state of slew flip-flop 202. It will be recalled from FIGURE 3(a) that flip-flop F1 was similarly set in this manner. The inputs to And gate 218 are derived from the outputs of gates 136' and gate 208. Gate 136' of course provides a true output signal when field winding A is energized and gate 208 will provide an output pulse at the termination of time interval $T_2$ when the slew mode is defined.

The output of Or gate 222 is connected to the reset input terminal of flip-flop F1. One input to the Or gate 222 is derived from the output and And gate 128' whose inputs are connected to the zero detect circuits 116', 118', 120', and 122'. Thus, flip-flop F1 will be reset when the zero detect circuits indicate that the armature velocity is zero. A second input to the Or gate 222 is derived from the output of And gate 224. The inputs to And gate 224 are respectively derived from the outputs of gates 140' and gate 208.

The output of Or gate 230 is connected to the set input terminal of flip-flop F2. A first input to gate 230 is derived from the true output terminal of multivibrator 142'. A second input to gate 230 is derived from the output of And gate 232. The inputs to And gate 232 are derived from the output of gate 134' which is used to energize the D field winding, and gate 208.

The reset input terminal of flip-flop F2 is connected to the output of Or gate 234. A first input to Or gate 234 is derived from the output of gate 236 whose input terminals are respectively connected to the output of gate 138' and the output of gate 208. Second and third inputs to Or gate 234 are connected to the false output terminals of multivibrators 142′ and 215.

In order to facilitate an understanding of the operation of the apparatus of FIGURE 5, reference will be made to the waveforms of FIGURE 4. Assume initially that the armature is in a fixed position having a zero velocity and that the external command source 152′ switches to a true state thereby defining the slew mode at time $e_2$. In response thereto, the multivibrator 142′ will switch to a true state switching flip-flop F2 to a true state through Or gate 230. With flip-flop F1 still defining a false state and flip-flop F2 defining a true state, And gate 136′ will energize field winding A to start the armature into motion. As a consequence, negative threshold circuit 132′ will thereafter provide a pulse $e_1$ when the armature reaches a certain position. Since slew flip-flop 202 still defines a false state, And gate 220 will subsequently switch flip-flop F1 to a true state to thereby energize field winding B through And gate 138′. When threshold circuit 206 next provides an output pulse $e_2$, this will switch the slew flip-flop 202 to a true state and will switch multivibrator 210 to a true state through Or gate 212.

After the interval $T_2$ defined by multivibrator 210, And gate 208 will provide a true output pulse to each of And gates 218, 224, 232, and 236. Since And gate 138′ is providing a true signal to energize field winding B, flip-flop F2 will be reset to a false state through gate 236 to thereafter cause And gate 140′ to provide a true output signal to energize field winding C. When threshold circuit 213 thereafter provides output pulse $e_3$, multivibrator 210 will be set through Or gate 212. After an interval $T_2$, And gate 208 will then again provide a true output pulse to this time switch flip-flop F1 to a false state to energize field winding D through And gate 134′. When threshold circuit 214 next provides an output pulse $e_4$, multivibrator 210 will again be set and at the end of an interval $T_2$, flip-flop F2 will be set to energize field winding A through And gate 136′. When threshold circuit 132′ provides a pulse $e_1$, flip-flop F1 will be reset to reset flip-flop F1 to thereafter energize field winding A. If prior to pulse $e_2$ being provided the external command source 152′ switches to a false state, then the pulse $e_2$ will switch the slew flip-flop 202 to a false state. When slew flip-flop 202 switches to a false state, multivibrator 215 is set. After an interval $T_3$ which will expire at point 78′ under maximum friction conditions and at point 80′ under minimum friction conditions, flip-flop F2 will be reset to thereby energize field winding C. When the zero detect circuits 116′, 118′, 120′, 122′ indicate that the armature has reached a zero velocity, And gate 128′ will reset flip-flop F1 to thereby energize field winding D to lock the armature into position.

From the foregoing, it should be appreciated that an improved system for driving mechanical loads has been disclosed herein wherein it is initially desirable to exert a maximum force on the load and it is further desirable to be able to rapidly brake the movement of the load without oscillation. In the preferred embodiment of the invention, a paper drive system has been disclosed in which paper is moved one line at a time in a step mode in response to a four step sequence of a stepping motor. The initial steps in the stepping motor sequence are used to apply a high force or introduce a great deal of early energy into the armature and the subsequent steps in the sequence are used to dissipate this energy. In addition to operating in a step mode, operation in a slew mode has been described wherein an armature is continually moved at a high steady rate with the amount of kinetic energy of the armature being limited by the frequency with which the field windings are energized.

Although the utility of the invention has been disclosed primarily for driving paper in line printers, the teachings herein can be utilized to drive other mechanical loads where rapid positive positioning is desired. For example, the invention could be useful for positioning magnetic heads on appropriate tracks over a data storage disc. Also, it is pointed out that although the exemplary printing apparatus referred to is of the impact type wherein hammers are employed to force the paper against a printing drum, the invention is of course equally as applicable in printers using non-impact printing, as for example where electrostatic printing is employed.

What is claimed is:

1. In a printing apparatus, a system for moving paper with a maximum average force from an initial rest position to a final rest position and for braking the paper movement without oscillation, said system including:
   a stepping motor having a movable armature and including a plurality of positioning means, each positioning means being individually energizable to exert a positive force on the armature when the armature is to a first side of a unique position associated therewith and a negative force when the armature is to a second side of said unique position;
   means coupling said armature to said paper;
   means energizing a first of said positioning means to exert a positive force on said armature thereby imparting kinetic energy thereto;
   means energizing a second of said positioning means to exert a negative force on said armature thereby substantially dissipating the kinetic energy thereof at the unique position associated with a third of said positioning means;
   means for providing an indication when the kinetic energy of said armature substantially equals zero; and
   means responsive to said indication of energizing said third positioning means.

2. In a printing apparatus, a system for moving paper with a maximum average force from an initial rest position to a final rest position and for braking the paper movement without oscillation under varying friction conditions, said system including:
   a stepping motor having a movable armature and including at least one set of four positioning means, each positioning means being individually energizable to exert a positive force on the armature when the armature is to a first side of a unique position associated therewith and a negative force when the armature is to a second side of said unique position;
   means coupling said armature to said paper;
   means energizing a first of said positioning means to exert a positive force on said armature thereby imparting kinetic energy thereto;
   means providing a first indication when the positive force exertable by a second of said positioning means exceeds that exertable by said first positioning means;
   means responsive to said first indication for deenergizing said first positioning means and for energizing said second positioning means to thereby impart additional kinetic energy to said armature;
   means energizing a third of said positioning means to exert a negative force on said armature thereby substantially dissipating the kinetic energy thereof at the unique position associated with a third of said positioning means;
   means for providing a second indication when the kinetic energy of said armature substantially equals zero; and
   means responsive to said second indication for energizing said fourth positioning means.

3. The system of claim 2 wherein said first positioning means is energized at $T_0$ and said third positioning means is energized at time $T_0+T_1$ and wherein said armature will be to said first side of the unique position associated with said third positioning means at time $T_0+T_1$ when a maximum friction condition prevails and to said second side of said unique position when a minimum friction condition prevails.

4. In a system for mechanically incrementally driving a load coupled to a movable armature of a stepping motor including a plurality of positioning means, each positioning means being individually energizable to exert a positive force on the armature when the armature is to a first side of a unique position associated therewith and a negative force when the armature is to a second side of said unique position:

first means energizing a first of said positioning means to exert a positive force on said armature thereby imparting kinetic energy thereto;

means providing a first indication when the positive force exertable by a second of said positioning means exceeds that exertable by said first positioning means; and means responsive to said first indicaiton for deenergizing said first positioning means and for energizing said second positioning means to thereby impart additional kinetic energy to said armature.

5. The system of claim 4 including means for inhibiting the energization of said second positioning means and the deenergization of said first positioning means for a predetermined time interval after the initial energization of said first positioning means.

6. The system of claim 4 including means for substantially dissipating the kinetic energy of said armature coincident with it moving to said unique position associated with a fourth of said positioning means; and means for energizing said fourth positioning means when said armature is substantially coincident with the unique position associated therewith.

7. A system for mechanically moving a load from an initial rest position to a final rest position, said system including:

a stepping motor having a movable armature and a plurality of positioning means, each positioning means being selectively energizable to apply a positive force to said armature tending to move it in a first direction to a position unique thereto and to apply a negative force to said armature tending to move it in a second direction to return it to said unique position;

first means energizing a first of said positioning means to apply a force to said armature in a first direction thereby imparting positive kinetic energy thereto;

second means subsequently energizing a second of said positioning means to apply a force to said armature to dissipate the kinetic energy thereof by the time it reaches a position unique to a third of said positioning means;

means for indicating when the kinetic energy of said armature substantially equals zero; and means responsive to said armature kinetic energy substantially equaling zero for energizing a third of said positioning means.

8. A system for mechanically moving a load from an initial rest position to a final rest position, said system including:

a stepping motor having a movable armature and a plurality of positioning means, each positioning means being selectively energizable to apply a positive force to said armature tending to move it in a first direction to a position unique thereto and to apply a negative force to said armature tending to move it in a second direction to return it to said unique position;

first means energizing a first of said positioning means at time $T_0$ to apply a force to said armature in a first direction thereby imparting positive kinetic energy thereto;

second means subsequently energizing a second of said positioning means at time $T_0+T_1$ to apply a force to said armature to dissipate the kinetic energy thereof by the time it reaches a position unique to said third of said positioning means;

means for indicating when the kinetic energy of said armature substantially equals zero; and means responsive to said armature kinetic energy substantially equaling zero for energizing a third of said positioning means.

9. The system of claim 8 wherein immediately subsequent to time $T_0+T_1$ said energized second positioning means will apply a positive force to said armature if maximum friction conditions prevail and a negative force to said armature if minimum friction conditions prevail.

10. A system for mechanically moving a load from an initial rest position to a final rest position, said system including:

a stepping motor having a movable armature and a plurality of positioning means, each positioning means being selectively energizable to apply a positive force to said armature tending to move it in a first direction to a position unique thereto and to apply a negative force to said armature tending to move it in a second direction to return it to said unique position;

first means energizing a first of said positioning means at time $T_0$ to apply a force to said armature in a first direction thereby imparting positive kinetic energy thereto;

second means subsequently energizing a second of said positioning means at time $T_0+T_1$ to apply a force to said armature to dissipate the kinetic energy thereof by the time it reaches a position unique to said third of said positioning means;

means for indicating when the kinetic energy of said armature equals zero; and means responsive to said armature kinetic energy equaling zero for energizing a third of said positioning means.

11. A system for mechanically moving a load from an initial rest position to a final rest position, said system including:

a stepping motor having a movable armature and a plurality of positioning means, each positioning means being selectively energizable to apply a positive force to said armature tending to move it in a first direction to a position unique thereto and to apply a negative force to said armature tending to move it in a second direction to return it to said unique position;

first means energizing a first of said positioning means to apply a force to said armature in a first direction thereby imparting positive kinetic energy thereto;

second means subsequently energizing a second of said positioning means to apply a force to said armature in a first direction thereby imparting additional positive kinetic energy thereto;

third means subsequently energizing a third of said positioning means to apply a force to said armature to dissipate the kinetic energy thereof by the time it reaches a position unique to a fourth of said positioning means; and fourth means energizing a fourth of said positioning means when said armature reaches said position unique thereto.

12. The system of claim 11 including means for providing a first indication when said armature is at a position such that the positive force applied thereto by an energized second means exceeds that applied thereto by an energized first means; and means responsive to said first indication for energizing said second means and deenergizing said first means.

13. A system for mechanically moving a load from an initial rest position to a final rest position, said system including:

a stepping motor having a movable armature and a plurality of positioning means, each positioning means being selectively energizable to apply a positive force to said armature tending to move it in a first direction to a position unique thereto and to apply a negative force to said armature tending to move it in a second direction to return it to said unique position;

first means energizing a first of said positioning means at time $T_0$ to apply a force to said armature in a first direction thereby imparting positive kinetic energy thereto;

second means subsequently energizing a second of said positioning means to apply a force to said armature in a first direction thereby imparting additional positive kinetic energy thereto;

third means subsequently energizing a third of said positioning means at time $T_0+T_1$ to apply a force to said armature to dissipate the kinetic energy thereof by the time it reaches a position unique to a fourth of said positioning means;

means for indicating when the kinetic energy of said armature equals zero;

means responsive to said armature kinetic energy equaling zero for energizing a fourth of said positioning means; and means coupling said armature to said load.

14. The system of claim 13 wherein immediately subsequent to time $T_0+T_1$ said energized second positioning means will apply a positive force to said armature if maximum friction conditions prevail and a negative force to said armature if minimum friction conditions prevail.

15. The system of claim 13 including means for providing a first indication when said armature is at a position such that the positive force applied thereto by an energized second means exceeds that applied thereto by an energized first means; and means responsive to said first indication for energizing said second means and deenergizing said first means.

References Cited

UNITED STATES PATENTS 3,345,547 10/1967 Dunne _____ 318—138
3,353,076 11/1967 Haines _____ 318—138

ORIS L. RADER, *Primary Examiner.*

G. SIMMONS, *Assistant Examiner.*

U.S. Cl. X.R.

318—254